(12) United States Patent
Bartosz

(10) Patent No.: US 12,473,093 B2
(45) Date of Patent: Nov. 18, 2025

(54) OUTFLOW ENERGY RECOVERY SYSTEM

(71) Applicant: Hamilton Sundstrand Corporation, Charlotte, NC (US)

(72) Inventor: Lance R. Bartosz, Granby, MA (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 207 days.

(21) Appl. No.: 18/217,010

(22) Filed: Jun. 30, 2023

(65) Prior Publication Data

US 2025/0002161 A1    Jan. 2, 2025

(51) Int. Cl.
*B64D 13/08*    (2006.01)
*B64D 13/06*    (2006.01)

(52) U.S. Cl.
CPC ...... *B64D 13/08* (2013.01); *B64D 2013/0618* (2013.01); *B64D 2013/0648* (2013.01)

(58) Field of Classification Search
CPC ............ B64D 13/08; B64D 2013/0618; B64D 2013/0648; B64D 2013/0644; B64D 13/06; Y02T 50/50
USPC ......................................................... 62/239
See application file for complete search history.

(56) References Cited

U.S. PATENT DOCUMENTS

| | | | |
|---|---|---|---|
| 2,618,470 A * | 11/1952 | Brown ...................... | F02C 6/06 417/406 |
| 2,767,561 A * | 10/1956 | Seeger ................... | B64D 13/06 62/177 |
| 3,158,197 A | 11/1964 | Leonard | |
| 4,295,518 A * | 10/1981 | Rannenberg .......... | F24F 5/0085 62/401 |

(Continued)

FOREIGN PATENT DOCUMENTS

| | | |
|---|---|---|
| CN | 108425752 A | 8/2018 |
| EP | 1806288 A2 | 7/2007 |

(Continued)

OTHER PUBLICATIONS

Extended European Search Report for EP Application No. 24185794. 5, dated Oct. 18, 2024, 11 pages.

(Continued)

*Primary Examiner* — Eric S Ruppert
*Assistant Examiner* — Kirstin U Oswald
(74) *Attorney, Agent, or Firm* — Kinney & Lange, P.A.

(57) ABSTRACT

An air intake system includes a ram air cooling circuit, an air compression system, and an energy recovery system. The cooling circuit includes an inlet, an outlet, and a heat exchanger. The outlet is downstream from the inlet. The heat exchanger is between the inlet and the outlet. The compression system includes an inlet duct, a rotary machine, and an outlet duct. The inlet duct is downstream from the cooling circuit inlet. The rotary machine includes a shaft mechanically connecting a first compressor section, a second compressor section, a motor section, and a turbine section. The first compressor section is downstream from the inlet duct and upstream from the heat exchanger. The second compressor section is downstream from the heat exchanger. The outlet duct is downstream from the second compressor section. The energy recovery system includes a compartment downstream from the outlet duct and upstream from the turbine section.

18 Claims, 2 Drawing Sheets

(56) References Cited

U.S. PATENT DOCUMENTS

| | | | | |
|---|---|---|---|---|
| 4,374,469 | A * | 2/1983 | Rannenberg | B64D 13/06 62/402 |
| 4,419,926 | A * | 12/1983 | Cronin | B64D 13/06 454/74 |
| 4,493,195 | A * | 1/1985 | Zalesak | B64D 13/06 62/304 |
| 4,505,124 | A | 3/1985 | Mayer | |
| 4,829,775 | A * | 5/1989 | Defrancesco | F24F 3/04 62/402 |
| 5,025,642 | A | 6/1991 | Brunskill et al. | |
| 5,086,622 | A * | 2/1992 | Warner | B64D 13/06 62/88 |
| 5,214,935 | A * | 6/1993 | Brunskill | F24F 5/0085 62/402 |
| 5,414,992 | A * | 5/1995 | Glickstein | F02C 7/224 60/39.83 |
| 5,461,882 | A * | 10/1995 | Zywiak | B64D 13/06 62/401 |
| 5,490,645 | A * | 2/1996 | Woodhouse | B64D 41/00 454/71 |
| 5,701,755 | A | 12/1997 | Severson et al. | |
| 5,704,218 | A * | 1/1998 | Christians | B64D 13/06 62/402 |
| 5,899,085 | A * | 5/1999 | Williams | B64D 13/06 62/236 |
| 5,967,461 | A | 10/1999 | Farrington | |
| 6,182,435 | B1 | 2/2001 | Niggemann et al. | |
| 6,913,636 | B2 * | 7/2005 | Defrancesco | B64D 37/32 96/108 |
| 7,302,804 | B2 | 12/2007 | Murry et al. | |
| 9,470,218 | B2 | 10/2016 | Eowsakul | |
| 9,669,936 | B1 | 6/2017 | Fiterman et al. | |
| 9,724,979 | B1 * | 8/2017 | Thumati | G05B 23/0254 |
| 10,202,197 | B2 | 2/2019 | Bammann et al. | |
| 10,207,809 | B2 * | 2/2019 | Koerner | B64D 13/06 |
| 10,295,284 | B2 * | 5/2019 | Hanov | F28G 15/003 |
| 10,526,092 | B2 | 1/2020 | Defrancesco | |
| 10,773,817 | B1 * | 9/2020 | Brennen | B64D 33/02 |
| 11,174,031 | B2 | 11/2021 | Ho et al. | |
| 11,286,857 | B2 * | 3/2022 | Bartosz | B64D 13/08 |
| 11,440,674 | B2 | 9/2022 | Hiller | |
| 11,511,872 | B2 | 11/2022 | Staubach et al. | |
| 11,542,017 | B2 | 1/2023 | Bammann et al. | |
| 11,628,939 | B2 | 4/2023 | Coutin et al. | |
| 2002/0121103 | A1 * | 9/2002 | Udobot | F28F 19/006 62/93 |
| 2003/0051492 | A1 * | 3/2003 | Hartenstein | B64D 13/06 62/402 |
| 2003/0051500 | A1 | 3/2003 | Asfia et al. | |
| 2003/0126880 | A1 * | 7/2003 | Zywiak | B64D 13/06 62/402 |
| 2004/0195448 | A1 * | 10/2004 | Flatman | F25B 9/004 244/118.5 |
| 2006/0117956 | A1 * | 6/2006 | Schwalm | B64D 37/32 96/108 |
| 2006/0231680 | A1 | 10/2006 | Derouineau et al. | |
| 2007/0062371 | A1 | 3/2007 | Eilers | |
| 2011/0005244 | A1 * | 1/2011 | Finney | F25B 9/06 62/87 |
| 2011/0131999 | A1 | 6/2011 | Gao et al. | |
| 2014/0326135 | A1 | 11/2014 | Massey et al. | |
| 2014/0331692 | A1 * | 11/2014 | Eowsakul | F04B 39/066 62/402 |
| 2014/0357176 | A1 | 12/2014 | Beers et al. | |
| 2015/0004011 | A1 | 1/2015 | Army et al. | |
| 2015/0104301 | A1 | 4/2015 | Colson et al. | |
| 2015/0314877 | A1 | 11/2015 | Mcauliffe et al. | |
| 2016/0025339 | A1 | 1/2016 | Kamath et al. | |
| 2016/0153460 | A1 | 6/2016 | Okabe | |
| 2016/0311551 | A1 | 10/2016 | Daniello | |
| 2019/0002109 | A1 * | 1/2019 | Bruno | B64D 13/08 |
| 2019/0291875 | A1 * | 9/2019 | Behrens | B64D 13/06 |
| 2020/0130849 | A1 | 4/2020 | Hennig et al. | |
| 2021/0300575 | A1 | 9/2021 | Staubach et al. | |
| 2022/0340287 | A1 * | 10/2022 | Mackin | B64D 13/08 |
| 2022/0364513 | A1 | 11/2022 | Muldoon et al. | |
| 2023/0058816 | A1 | 2/2023 | Mikic et al. | |
| 2023/0069975 | A1 | 3/2023 | Quartarone et al. | |
| 2023/0303252 | A1 | 9/2023 | Vignali | |

FOREIGN PATENT DOCUMENTS

| | | |
|---|---|---|
| EP | 4049934 A1 | 8/2022 |
| EP | 4279387 A1 | 11/2023 |
| JP | H05322216 A | 12/1993 |
| WO | 2022189154 A1 | 9/2022 |
| WO | 2022189157 A1 | 9/2022 |

OTHER PUBLICATIONS

Extended European Search Report for EP Application No. 24185834.9, dated Nov. 27, 2024, 11 pages.
Extended European Patent Report for European Patent Application No. 18171633.3, dated Jun. 22, 2018, 9 pages.
Communication pursuant to Article 94(3) EPC for European Patent Application No. 18171633.3, dated Oct. 22, 2019, 5 pages.
Extended European Search Report for EP Application No. 24185811.7, dated Dec. 2, 2024, 11 pages.

* cited by examiner

OUTFLOW ENERGY RECOVERY SYSTEM

BACKGROUND

This application relates to aircraft environmental control systems and, more particularly, aircraft environmental control systems that recapture energy from air being discharged overboard.

Aircraft also utilize environmental control systems to provide air at a usable pressure, temperature, and humidity to the aircraft. Environmental control systems for aircraft use air compressors, heat exchangers, cooling systems, and water collectors to cool, pressurize, and humidify air for use in passenger cabins, cockpits, and electronics bays. Turbocompressors are rotary machines driven by a turbine section connected to a compressor section. Turbocompressors can include multiple compressor sections and electrical motors. Air moving through the environmental control system can turn a wheel in the turbine and transfer torque to the compressor section.

SUMMARY

An air intake system includes a ram air cooling circuit, an air compression system, and an energy recovery system. The cooling circuit includes an inlet, an outlet, and a heat exchanger. The outlet is downstream from the inlet. The heat exchanger is between the inlet and the outlet. The air compression system includes an inlet duct, a rotary machine, and an outlet duct. The inlet duct is downstream from the cooling circuit inlet. The rotary machine includes a shaft mechanically connecting a first compressor section, a second compressor section, a motor section, and a turbine section. The first compressor section is downstream from the inlet duct and upstream from the heat exchanger. The second compressor section is downstream from the heat exchanger. The outlet duct is downstream from the second compressor section. The energy recovery system is fluidly connected to a compartment downstream from the outlet duct and upstream from the turbine section.

A fresh air inflow system for an environmental control system on an aircraft includes a ram air cooling circuit, an air compression system, and an energy recovery system. The ram air cooling circuit includes a ram air inlet and a ram air outlet. The ram air outlet is downstream from the ram air inlet. The air compression system includes an inlet duct and a rotary machine. The inlet duct is downstream from the ram air inlet. The rotary machine includes a shaft mechanically connecting a first compressor section, a motor section, and a turbine section. The first compressor section is downstream from the inlet duct. The energy recovery system includes a compartment downstream from the first compressor section and upstream from the turbine section of the rotary machine. The compartment is at a first air pressure. An environment exterior to the aircraft is at a second air pressure. The first air pressure is higher than the second air pressure.

DETAILED DESCRIPTION

Figure 1:
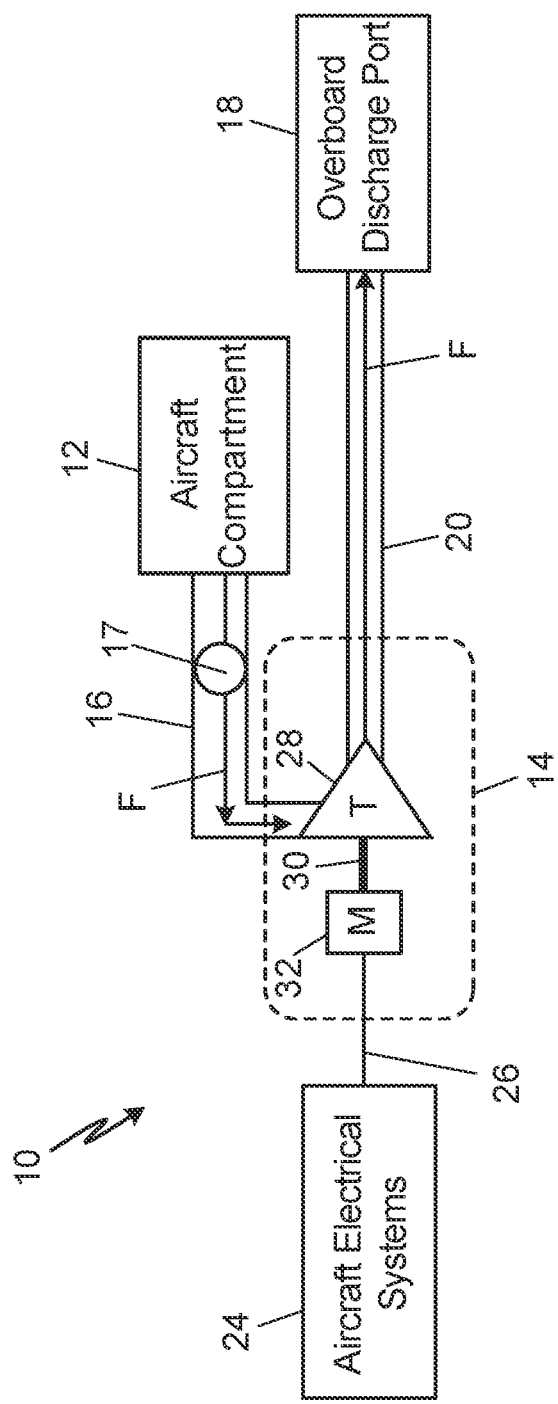
FIG. 1 is a schematic view of an energy recovery system.

FIG. 1 is a schematic view of energy recovery system 10, which includes aircraft compartment 12, electric turbogenerator 14, inlet duct 16, overboard compartment pressure regulating valve 17, discharge port 18, outlet duct 20, aircraft electrical systems 24, and electrical connections 26. Electric turbogenerator 14 includes turbine section (T) 28, shaft 30, and motor section (M) 32. Energy recovery system 10 also includes flow path F.

Compartment 12 connects to turbogenerator 14 via inlet duct 16. Turbogenerator 14 can be any type of rotary machine that transfers shaft power from a turbine section to another section. For example, turbogenerator 14 could alternatively be a turbocompressor. Compartment pressure regulating valve 17 is positioned in inlet duct 16. Turbogenerator 14 connects to overboard discharge port 18 via outlet duct 20. Turbogenerator 14 electrically connects to aircraft electrical systems 24 via electrical connections 26. Turbogenerator 14 includes turbine section 28, shaft 30, and generator section 32. Turbine section 28 is connected to and rotates with generator section 32 via shaft 30. Flow path F begins at aircraft compartment 12 at an upstream portion and ends at overboard discharge port 18 at a downstream portion. Flow path F includes and moves through aircraft compartment 12, inlet duct 16, compartment pressure regulating valve 17, turbine section 28 of turbogenerator 14, outlet duct 20, and overboard discharge port 18.

Compartment 12 is a portion of the aircraft that is pressurized during operation. Compartment 12 can be, for example, a passenger cabin, a cockpit, a cargo compartment, an electronics bay, and combinations thereof. As such, air pressure in compartment 12 is higher than air pressure in an environment surrounding the aircraft. Pressurized air flows naturally from compartment 12 through turbine section 28 of turbogenerator 14 towards an exterior of the aircraft. Pressurized air expands through and turns turbine section 28 of turbogenerator 14. From there, air exits an outlet of turbine section 28 following flow path F through outlet duct 20. Air is throttled through compartment pressure regulating valve 17, which monitors and regulates pressure in compartment 12. Compartment pressure regulating valve 17 is, for example, a butterfly valve, a disc valve, a globe valve, a plug valve, a ball valve, and combinations thereof. Air is discharged overboard the aircraft through overboard discharge port 18.

Pressurized air following flow path F from compartment 12 overboard discharge port 18 creates shaft power as the air expands through turbine section 28. Shaft power is transferred from turbine section 28 to generator section 32 via shaft 30. Generator section 32 is, for example, an electrical alternator or generator. Generator section 32 acts as an electricity generator for the aircraft to create usable electricity for aircraft electrical systems 24. Electricity is transferred from turbogenerator 14 to aircraft electrical systems 24 via electrical connections 26.

Energy recovery system 10 allows for capture of potential energy existent in the differential air pressures between compartment 12 and air in the exterior environment surrounding the aircraft. Positioning ductwork including inlet duct 16 and outlet duct 20 around turbine section 28 of turbogenerator 14 allows for extraction of shaft power from turbine section 28 to shaft 30 from pressurized air flowing out of compartment 12. This is advantageous over typical systems which lose this potential energy by air flowing overboard. Shaft power can be converted into electrical energy to power aircraft electrical systems 24.

Figure 2:
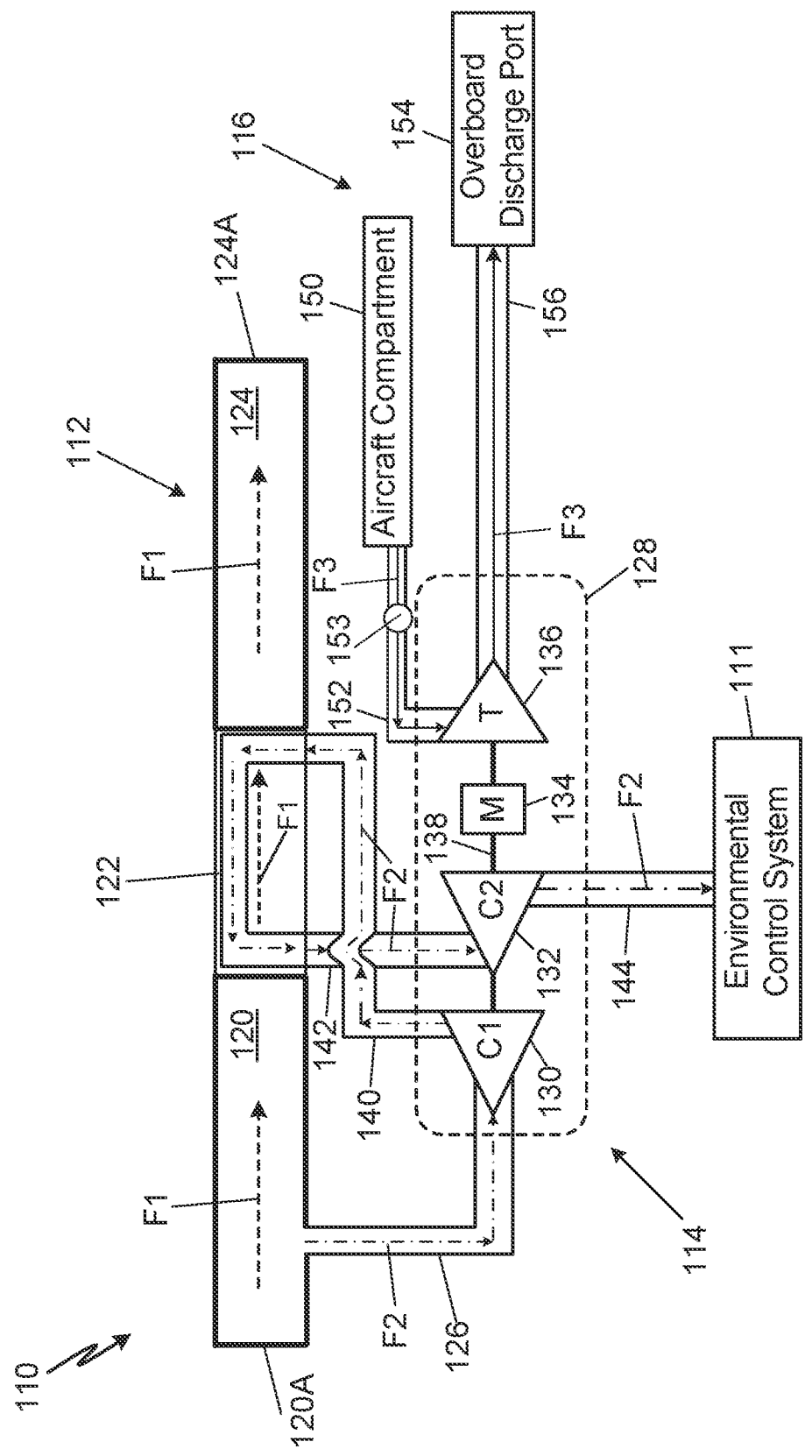
FIG. 2 is a schematic view of an air intake system for an environmental control system.

FIG. 2 shows air intake system 110 for use with environmental control system 111. Air intake system 110 includes three systems: ram air cooling circuit 112 with first flow path F1, air compression system 114 with second flow path F2, and energy recovery system 116 with third flow path F3. Ram air cooling circuit 112 includes ram air inlet duct 120 with ram air inlet 120A, heat exchanger (HX) 122, and ram air outlet duct 124 with ram air outlet 124A. Air compression system 114 includes inlet duct 126 and electric turbocompressor 128 which includes first compressor section (C1) 130, second compressor section (C2) 132, motor section (M) 134, turbine section (T) 136, and shaft 138. Air compression system 114 also includes heat exchanger inlet duct 140, heat exchanger 122, heat exchanger outlet duct 142, compressed air outlet duct 144, and environmental control system 111. Energy recovery system 116 includes compartment 150, inlet duct 152, compartment pressure regulating valve 153, turbine section 136 of turbocompressor 128, overboard discharge port 154, and outlet duct 156.

Ram air cooling circuit 112 is located near a top of FIG. 2. Ram air cooling circuit 112 includes ram air inlet duct 120 with ram air inlet 120A, heat exchanger 122, ram air outlet duct 124 with ram air outlet 124A, and first flow path F1 which is denoted in FIG. 2 by arrows with dashed tails. Ram air cooling circuit 112 takes ram air from an exterior of an aircraft to use as air in environmental control system 111 and as a cooling medium in heat exchanger 122. Ram air cooling circuit 112 begins at ram air inlet 120A of ram air inlet duct 120, which is an upstream portion of first flow path F1. Heat exchanger 122 is downstream from ram air inlet duct 120 and includes a hot side flow path and a cold side flow path. Ram air outlet duct 124 connects heat exchanger 122 to ram air outlet 124A, which is a downstream portion of first flow path F1.

Ram air inlet 120A is, for example, an air scoop positioned through a fuselage of the aircraft to direct air into ram air cooling circuit 112. Air follows first flow path F1 from ram air inlet 120A to ram air outlet 124A via ram air inlet duct 120, the cold side flow path through heat exchanger 122, and ram air outlet duct 124. The cold side flow path through heat exchanger 122 is downstream from ram air inlet 120A and upstream from ram air outlet 124A. Ram air outlet 124A is through a fuselage of the aircraft and discharges air overboard. Ram air is used as both a cooling medium in heat exchanger 122 and removes waste heat overboard via first flow path F1 moving through ram air outlet 124A. Ram air cooling circuit 112 is also a source of air for air compression system 114 and environmental control system 111 of the aircraft.

Air compression system 114 is located below ram air cooling circuit 112 on a left side of FIG. 2. Air compression system 114 includes air inlet duct 126 and electric turbocompressor 128 with first compressor section 130, second compressor section 132, motor section 134, turbine section 136, and shaft 138. Air compression system 114 also includes heat exchanger inlet duct 140, heat exchanger 122, heat exchanger outlet duct 142, and outlet duct 144, which supplies air to environmental control system 111. Air compression system 114 also includes second flow path F2, which is denoted in FIG. 2 by arrows with dashed and dotted tails. Air compression system 114 compresses external air for use by environmental control system 111 and subsequent provision to compartment 150.

Air compression system 114 begins at air inlet duct 126, which is a relatively upstream portion of second flow path F2. Inlet duct 126 has an inlet located in ram air inlet duct 120. Inlet duct 126 connects ram air inlet duct 120 with first compressor section 130 of electric turbocompressor 128. Electric turbocompressor 128 has first compressor section 130, second compressor section 132, motor section 134, and turbine section 136 positioned on and mechanically connected to shaft 138. First compressor section 130 is upstream from and connects to the hot side of heat exchanger 122 via heat exchanger inlet duct 140. Heat exchanger outlet duct 144 connects the hot side flow path of heat exchanger 122 to second compressor section 132 of electric turbocompressor 128, which is downstream from heat exchanger 122. Outlet duct 144 connects second compressor section 132 to environmental control system 111. Outlet duct 144 is a downstream portion of second flow path F2.

Air follows second flow path F2 through air compression system 114 by entering inlet duct 126. Inlet duct 126 uses external air that enters the aircraft through ram air inlet duct 120 of ram air circuit 112. Air then flows along inlet duct 126 to first compressor section 130, where air pressure is increased. First compressor section 130 is rotated via shaft 138 by turbine section 136 and/or motor section 134. Motor section 134 can be, for example, an electric motor powered by aircraft electrical systems. Rotation of first compressor section 130 and second compressor section 132 by turbine section 136 is augmented by motor section 134. Air flows from first compressor section 130 along second flow path F2 through heat exchanger inlet duct 140 into the hot side flow path of heat exchanger 122. Heat energy created by compressing the air in first compressor section 130 is transferred to air moving along first flow path F1 in the cold side of heat exchanger 122, thus cooling the air moving along second flow path F2. Air exits the hot side flow path of heat exchanger 122 and is ducted via heat exchanger outlet duct 142 to second compressor section 132, where air is further compressed. Second compressor section 132, like first compressor section 130, is rotated via shaft 138 by turbine section 136 and/or motor section 134. Air flows out of second compressor section 132 to environmental control system 111 via outlet duct 144. Environmental control system 111 further compresses, dehumidifies, and heats or cools the air before providing the air to compartment 150 of the aircraft.

Air compression system 114 uses turbocompressor 128, a two-stage serial compressor, to compress air before the air moves into environmental control system 111. This allows for fresh air to replace engine bleed air, which is typically used in environmental control systems of aircraft. Using fresh air rather than bleed air eliminates potential engine contamination of air provided to passengers in an aircraft. Utilizing fresh also eliminates engine bleed extraction and the resulting fuel burn penalties. Turbocompressor 128 also utilizes an electric motor section 134, which creates a more electric architecture and is compatible with various electrical power sources on the aircraft. Heat exchanger 122 removes waste heat created by first compressor section 130. Heat exchanger 122 improves overall performance of air compression system 114 while limiting peak surface temperatures to safe limits. Providing entry of air into air compression system 114 via ram air inlet duct 120 eliminates the need for multiple air scoops through the fuselage of the aircraft, thereby reducing drag and system complexity.

Energy recovery system 116 is in a right portion of FIG. 2 below ram air cooling circuit 112. Energy recovery system 116 includes aircraft compartment 150, inlet duct 152, compartment pressure regulating valve 153, turbine section 136 of turbocompressor 128, outlet duct 156 and overboard discharge port 154 . . . . Energy recovery system 116 also includes third flow path F3, which is denoted in FIG. 2 by an arrow with a solid tail. Energy recovery system 116 has the same general structure and function as energy recovery system 10, as described in relation to FIG. 1.

Compartment 150 connects to turbine section 136 of turbocompressor 128 via inlet duct 152. Compartment pressure regulating valve 153 is positioned in inlet duct 152 upstream from turbine section 136. Turbine section 136 of turbocompressor 128 connects to overboard discharge port 154 via outlet duct 156. Overboard discharge port 154 is positioned through a fuselage of the aircraft. Alternatively, overboard discharge port 154 can be positioned in ram air outlet duct 124 such that air is discharged overboard through ram air outlet 124A. This alternative positioning eliminates a separate discharge port through the fuselage of the aircraft to reduce drag on the aircraft. Third flow path F3 begins at compartment 150, which is an upstream portion of third flow path F3, and ends at overboard discharge port 154, which is a downstream portion of third flow path F3. Third flow path F3 moves through inlet duct 152, compartment pressure regulating valve 153, turbine section 136 of turbocompressor 128, and outlet duct 156 before ending outside of the aircraft after moving through overboard discharge port 154.

Compartment 150 is a portion of the aircraft that is pressurized by environmental control system 111 during operation of the aircraft. Compartment 150 can be, for example, a passenger cabin, a cockpit, a cargo compartment, an electronics bay, and combinations thereof. Compartment 150 is downstream from environmental control system 111. Air pressure in compartment 150 is higher than air pressure in an environment surrounding the aircraft during operation such as during takeoff, landing, and flight. Pressurized air flows from compartment 150 to turbine section 136 of turbocompressor 128 via inlet duct 152 following third flow path F3. Pressurized air expands through and turns turbine section 136 of turbocompressor 128. Shaft power gained from pressurized air turning turbine section 136 of turbocompressor 128 is transferred to first compressor section 130, second compressor section 132, and motor section 134 via shaft 138. The transferred shaft power turns first compressor section 130 and second compressor section 132 to compress air moving along second flow path F2. Shaft power transferred from turbine section 136 can also turn motor section 134, as necessary, to generate electrical energy for other aircraft components, as described in relation to energy recovery system 10 of FIG. 1 above. Air exits turbine section 136 following third flow path F3 into and through outlet duct 156. Air following third flow path F3 is throttled through compartment pressure regulating valve 153, which monitors and regulates pressure in compartment 150 . . . . Compartment pressure regulating valve 153 can be, for example, a butterfly valve, a disc valve, a globe valve, a plug valve, a ball valve, and combinations thereof. Air is discharged overboard the aircraft through overboard discharge port 154.

Pressurized air following third flow path F3 from compartment 150 overboard discharge port 154 creates shaft power as the air expands through turbine section 136. Shaft power is transferred from turbine section 136 to first compressor section 130 and second compressor section 132 via shaft 138. Powering first compressor section 130 and second compressor section 132 with the rotation of turbine section 136 is energy efficient and captures energy from third flow path F3 that would otherwise be lost.

DISCUSSION OF POSSIBLE EMBODIMENTS

The following are non-exclusive descriptions of possible embodiments of the present invention.

In one aspect, an air intake system for an aircraft includes a ram air cooling circuit, an air compression system, and an energy recovery system. The ram air cooling circuit includes a ram air inlet, a ram air outlet, and a heat exchanger. The ram air outlet is downstream from the ram air inlet. The heat exchanger is between the ram air inlet and the ram air outlet. The compression system includes an inlet duct, a rotary machine, and an outlet duct. The inlet duct is downstream from the ram air inlet. The rotary machine includes a shaft mechanically connecting a first compressor section, a second compressor section, a motor section, and a turbine section. The first compressor section is downstream from the inlet duct and upstream from the heat exchanger. The second compressor section is downstream from the heat exchanger. The outlet duct is downstream from the second compressor section. The energy recovery system includes a compartment in the aircraft downstream from the compression system outlet duct and upstream from the rotary machine turbine section.

The air intake system of the preceding paragraph can optionally include, additionally and/or alternatively, any one or more of the following features, configurations, and/or components:

An embodiment of the air intake system of the preceding paragraph, wherein the ram air circuit further includes a ram air inlet duct positioned downstream from the ram air inlet.

An embodiment of the air intake system of any of the preceding paragraphs, wherein the ram air circuit further includes a ram air outlet duct downstream from the ram air inlet duct and upstream from the ram air outlet. The heat exchanger is positioned between the ram air inlet duct and the ram air outlet duct.

An embodiment of the air intake system of any of the preceding paragraphs, wherein an inlet of the inlet duct of the air compression system is positioned in the ram air inlet duct.

An embodiment of the air intake system of any of the preceding paragraphs, wherein the ram air inlet is an air scoop positioned through a fuselage of the aircraft.

An embodiment of the air intake system of any of the preceding paragraphs, wherein the outlet duct of the air compression system is upstream from an environmental control system.

An embodiment of the air intake system of any of the preceding paragraphs, wherein the energy recovery system further includes a discharge port downstream from an outlet of the turbine section.

An embodiment of the air intake system of any of the preceding paragraphs, wherein the energy recovery system further includes a duct connecting the outlet of the turbine section and the discharge port.

An embodiment of the air intake system of any of the preceding paragraphs, wherein the valve monitors and controls an air pressure in the compartment.

An embodiment of the air intake system of any of the preceding paragraphs, wherein the valve is chosen from the group consisting of a butterfly valve, a disc valve, a globe valve, a plug valve, a ball valve, and combinations thereof.

An embodiment of the air intake system of any of the preceding paragraphs, wherein air flows from the compartment, through a valve positioned inside the duct and through the turbine section to turn the shaft in the rotary machine.

An embodiment of the air intake system of any of the preceding paragraphs, wherein the air intake system further includes a valve upstream from the turbine section.

An embodiment of the air intake system of any of the preceding paragraphs, wherein the heat exchanger includes a cold side flow path downstream from the ram air inlet and upstream from the ram air outlet.

An embodiment of the air intake system of any of the preceding paragraphs, wherein the heat exchanger includes a hot side flow path downstream from the first compressor section and upstream from the second compressor section.

An embodiment of the air intake system of any of the preceding paragraphs, wherein the compartment is a space in the aircraft chosen from the group consisting of a passenger cabin, a cockpit, an electronics bay, and combinations thereof.

In another embodiment, an air intake system for an environmental control system on an aircraft includes a ram air cooling circuit, an air compression system, and an energy recovery system. The ram air cooling circuit includes a ram air inlet and a ram air outlet. The ram air outlet is downstream from the ram air inlet. The compression system includes an inlet duct and a rotary machine. The inlet duct is downstream from the ram air inlet. The rotary machine includes a shaft mechanically connecting a first compressor section, a motor section, and a turbine section. The first compressor section is downstream from the inlet duct. The energy recovery system includes a compartment downstream from the first compressor section and upstream from the turbine section of the rotary machine. The compartment is at a first air pressure. The inlet of the turbine section is at a second air pressure. The first air pressure is higher than the second air pressure.

An embodiment of the air intake system of any of the preceding paragraphs, wherein the energy recapture system further includes a discharge port downstream from an outlet of the turbine section, wherein the discharge port is positioned through a fuselage of the aircraft.

An embodiment of the air intake system of any of the preceding paragraphs, wherein the energy recapture system further includes a discharge port downstream from an outlet of the turbine section, wherein the discharge port is positioned in the ram outlet duct to eliminate a separate fuselage penetration.

An embodiment of the air intake system of any of the preceding paragraphs, wherein the energy recapture system further includes a valve upstream from the turbine section. The air moving toward the turbine section is throttled over the valve to monitor and control the first air pressure of the compartment.

An embodiment of the air intake system of any of the preceding paragraphs, wherein the ram air cooling circuit further includes a ram air inlet duct positioned downstream from the ram air inlet.

a ram air outlet duct downstream from the ram air inlet duct and upstream from the ram air outlet;

An embodiment of the air intake system of any of the preceding paragraphs, wherein the ram air cooling circuit further includes a heat exchanger positioned between the ram air inlet duct and the ram air outlet duct.

An embodiment of the air intake system of any of the preceding paragraphs, wherein the first compressor section is upstream from the heat exchanger.

An embodiment of the air intake system of any of the preceding paragraphs, wherein the rotary machine of the air compression system further includes a second compressor section mechanically connected to the shaft. The second compressor section is downstream from the heat exchanger and upstream from an outlet of the air compression system.

An embodiment of the air intake system of any of the preceding paragraphs, wherein the energy recapture system further includes a duct connecting the outlet of the turbine section and the discharge port.

An embodiment of the air intake system of any of the preceding paragraphs, wherein air flows from the compartment and through the turbine section to turn the shaft in the rotary machine.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An air intake system for an aircraft, the air intake system comprising:
 a ram air cooling circuit comprising:
  a ram air inlet configured to receive ram air;
  a ram air outlet positioned downstream from the ram air inlet and configured to serve as an exit for the ram air from the ram air cooling circuit; and
  a heat exchanger positioned between the ram air inlet and the ram air outlet;
 an air compression system comprising:
  an inlet duct located downstream from the ram air inlet and configured to receive the ram air from the ram air inlet;
  a rotary machine comprising:
   a first compressor section downstream from the inlet duct and upstream from the heat exchanger of the ram air cooling circuit;
   a second compressor section downstream from the heat exchanger;
   a serial compression duct configured to fluidly connect, in flow order, the first compressor section, the heat exchanger, and the second compressor section;
   a motor section;
   a turbine section; and
   a shaft mechanically connecting the first compressor section, the second compressor section, the motor, and the turbine section; and
  an outlet duct downstream from the second compressor section and upstream from an environmental control system, and disposed to direct the ram air to the environmental control system; and
 an energy recovery system comprising:
  a compartment in the aircraft downstream from the environmental control system and upstream from the turbine section of the rotary machine.

2. The air intake system of claim 1, wherein the ram air circuit further comprises:
 a ram air inlet duct positioned downstream from the ram air inlet; and
 a ram air outlet duct downstream from the ram air inlet duct and upstream from the ram air outlet;
 wherein the heat exchanger is positioned between the ram air inlet duct and the ram air outlet duct.

3. The air intake system of claim 2, wherein an inlet of the inlet duct of the air compression system is positioned in the ram air inlet duct.

4. The air intake system of claim 1, wherein the ram air inlet is an air scoop positioned through a fuselage of the aircraft.

5. The air intake system of claim 1, wherein the energy recovery system further comprises:
   a discharge port downstream from an outlet of the turbine section; and
   a duct connecting the outlet of the turbine section and the discharge port.

6. The air intake system of claim 1, wherein the energy recovery system further comprises:
   a valve upstream from the turbine section.

7. The air intake system of claim 6, wherein the valve monitors and controls an air pressure in the compartment.

8. The air intake system of claim 6, wherein the valve is chosen from the group consisting of a butterfly valve, a disc valve, a globe valve, a plug valve, a ball valve, and combinations thereof.

9. The air intake system of claim 1, wherein air flows from the compartment and through the turbine section to turn the shaft in the rotary machine.

10. The air intake system of claim 1, wherein the heat exchanger comprises:
    a cold side flow path downstream from the ram air inlet and upstream from the ram air outlet, bypassing the first compressor before passing through the heat exchanger; and
    a hot side flow path downstream from the first compressor section and upstream from the second compressor section.

11. The air intake system of claim 1, wherein the compartment is a space in the aircraft chosen from the group consisting of a passenger cabin, a cockpit, a cargo compartment, an electronics bay, and combinations thereof.

12. An air intake system for an environmental control system on an aircraft, the air intake system comprising:
    a ram air cooling circuit comprising:
       a ram air inlet configured to receive ram air;
       a ram air outlet positioned downstream from the ram air inlet and configured to serve as an exit for the ram air from the ram air cooling circuit; and
       a heat exchanger positioned between the ram air inlet and the ram air outlet;
    an air compression system comprising:
       an inlet duct located downstream from the ram air inlet and configured to receive the ram air from the ram air inlet;
       a rotary machine comprising:
          a first compressor section downstream from the inlet duct;
          a second compressor section downstream from the heat exchanger;
          a serial compression duct configured to fluidly connect, in flow order, the first compressor section, the heat exchanger, and the second compressor section;
          a motor section;
          a turbine section; and
          a shaft mechanically connecting the first compressor section, the motor, and the turbine section; and
       an outlet duct downstream from the second compressor section and upstream from the environmental control system, and disposed to direct the ram air to the environmental control system; and
    an energy recovery system comprising:
       a compartment downstream from the environmental control system and upstream from the turbine section of the rotary machine, wherein the compartment is at a first air pressure,
       wherein an environment exterior to the aircraft is at a second air pressure, and wherein the first air pressure is higher than the second air pressure.

13. The air intake system of claim 12, wherein the energy recapture system further comprises:
    a discharge port downstream from an outlet of the turbine section, wherein the discharge port is positioned through a fuselage of the aircraft.

14. The air intake system of claim 13, wherein the energy recapture system further comprises:
    a valve upstream from an inlet of the turbine section, wherein air moving toward the inlet of the turbine section is throttled over the valve to monitor and control the first air pressure of the compartment.

15. The air intake system of claim 14, wherein the ram air cooling circuit further comprises:
    a ram air inlet duct positioned downstream from the ram air inlet; and
    a ram air outlet duct downstream from the ram air inlet duct and upstream from the ram air outlet;
    wherein the heat exchanger is positioned between the ram air inlet duct and the ram air outlet duct.

16. The air intake system of claim 15, wherein the energy recapture system further comprises:
    a duct connecting the outlet of the turbine section and the discharge port.

17. The air intake system of claim 16, wherein air flows from the compartment and through the turbine section to turn the shaft in the rotary machine.

18. The air intake system of claim 13, wherein the heat exchanger comprises:
    a cold side flow path downstream from the ram air inlet, upstream from the ram air outlet, and bypassing the first compressor before passing through the heat exchanger; and
    a hot side flow path downstream from the first compressor section and upstream from the second compressor section.

* * * * *